Dec. 20, 1966  F. W. CLEEREMAN  3,292,672
SAW ADJUSTING DEVICE
Filed Sept. 4, 1964  2 Sheets-Sheet 1
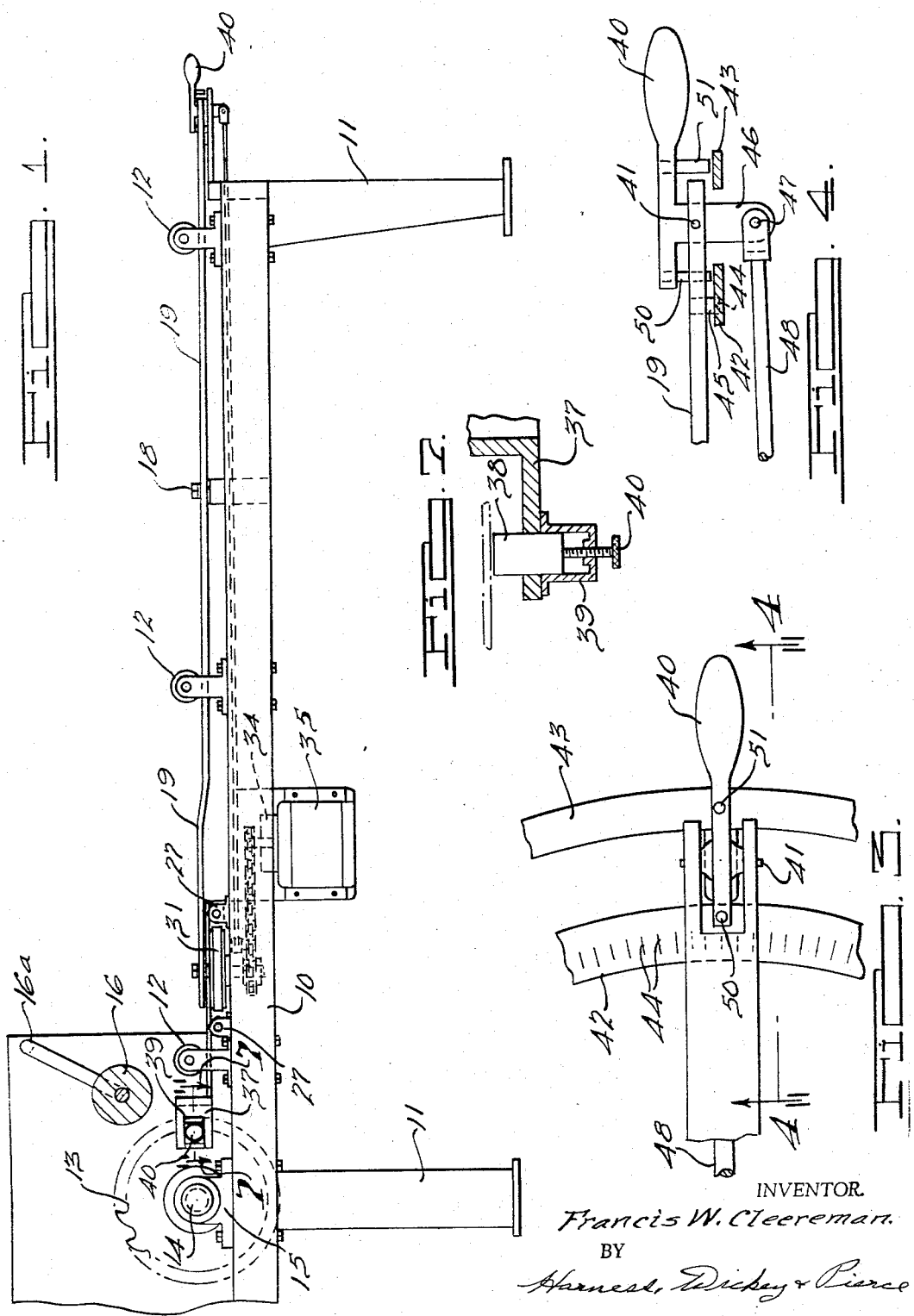
INVENTOR.
Francis W. Cleereman.
BY
Harness, Dickey & Pierce
ATTORNEYS.

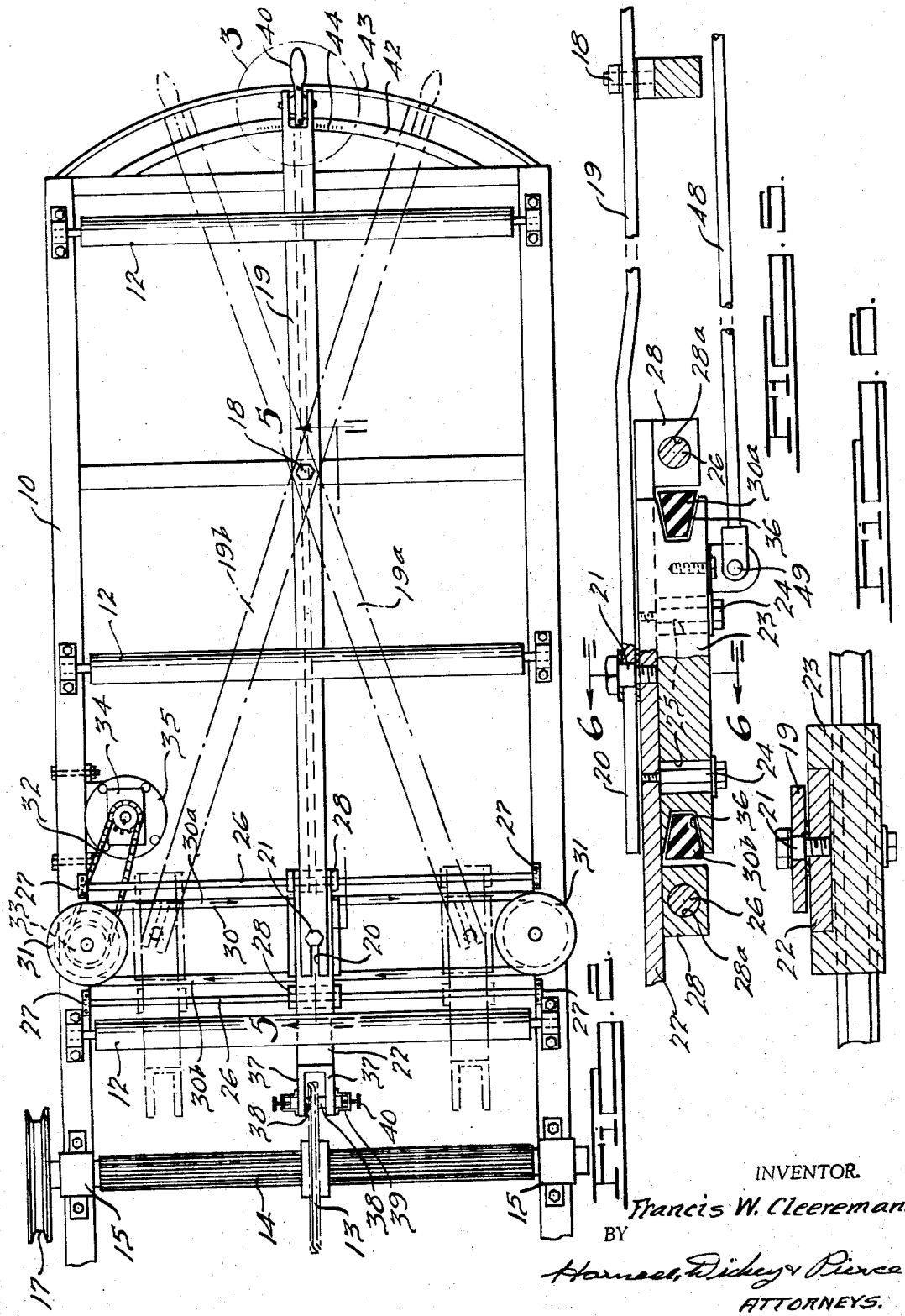

United States Patent Office 3,292,672
Patented Dec. 20, 1966

3,292,672
SAW ADJUSTING DEVICE
Francis W. Cleereman, Newald, Wis. 54551
Filed Sept. 4, 1964, Ser. No. 394,448
5 Claims. (Cl. 143—37)

This invention relates to a saw adjusting device and, more particularly, to an improved power means for shifting edging saws and the like which have heretofore been shifted by hand.

One of the objects of this invention is to provide a device of this type which is so reduced in the number and character of its component parts as to approach the ultimate in structural simplicity to thereby create an economy in its manufacture, installation and maintenance costs.

Another object of this invention is to provide a device of the type described in which the parts are so constructed that they may be made durable and rugged whereby the device may be made in a manner to withstand the rigorous demands imposed thereon in use.

The above and other objects and advantages of this invention are attained by a simple and inexpensive construction comprising a saw adjusting or shifting lever operatively connected at one end to a rotary saw to shift the saw when the device is operated. The other end of the lever is provided with a control handle for locking the lever in its adjusted positions and for controlling the operation of a shoe member adapted to operatively connect the saw shifting lever to a constantly driven, slow moving driving belt member. The belt member is preferably a V-belt and by shifting the shoe member the saw shifting lever is operatively connected to one or the other of two flights of the belt member whereby the saw shifting lever, and consequently the saw, is shifted or power driven in either direction so as to engage a workpiece at a predetermined point or desired location. After movement of the saw member as just described and upon release of the control handle, the saw adjusting or shifting lever is locked in its adjusted position whereby the sawing of the workpiece at the desired location can be completed as the workpiece passes through the device.

The various objects and advantages, and the novel details of construction of one commercially practical embodiment of the invention, will become more apparent as this description proceeds, especially when considered in connection with the accompanying drawings, in which:

FIGURE 1 is a side elevational view of a saw adjusting device constructed in accordance with this invention;

FIGURE 2 is a top plan view thereof;

FIGURE 3 is an enlarged fragmentary elevational view of the control handle including the parts enclosed by circle "3" in FIGURE 2;

FIGURE 4 is a sectional elevational view taken substantially on line 4—4 in FIGURE 3;

FIGURE 5 is a fragmentary sectional elevational view taken substantially on the plane indicated by line 5—5 in FIGURE 2;

FIGURE 6 is a fragmentary detail sectional view taken on line 6—6 in FIGURE 5; and FIGURE 7 is a detail sectional view taken on line 7—7 in FIGURE 1.

In the embodiment of the invention herein illustrated, there is provided a substantially rectangular frame 10 supported by legs 11. Rotatably mounted on the frame 10 are a plurality of workpiece supporting rollers 12, see particularly FIGURES 1 and 2, upon which the workpiece, such as a piece of lumber to be edged or the like, is fed to the saw.

The saw 13 is shown as mounted on a splined shaft 14 rotatably mounted in brackets 15 secured to the frame 10. As stated, the shaft 14 is splined so that the saw 13 rotates therewith, but the saw is longitudinally movable on the shaft 14. Adjacent the saw 13 the device may be provided with a weighted holddown roller 16 pivotally mounted as at 16a which engages the top of the workpiece as it approaches the saw 13. The shaft 14 may be driven by a drive means including a pulley 17 (see FIGURE 2) connected by a belt or other means to a motor or the like.

Pivotally mounted on a vertical pivot 18 secured to a cross member of the frame 10 is a saw adjusting lever or member 19. This lever swings or moves transversely of the frame 10, as indicated by the full and dot-and-dash lines in FIGURE 2.

The left-hand end of the lever member 19 is bifurcated, as indicated, to form a slot 20, to slidably receive a pivot member 21 to slidably connect the end of the lever member 19 to a lever extension member 22.

The extension 22, as shown in FIGURES 5 and 6, fits in a recess in the top of a shoe member 23. The shoe member 23 is slidably connected to the extension member 22 by bolts 24 which are threaded into the extension member 22 and engage slots 25 in the shoe member 23.

The shoe member 23 is mounted for movement transversely of the frame 10 by means of a pair of transversely extending supporting rods 26, the ends of which are mounted as at 27 on the frame. These rods slidably engage in openings 28a in abutment blocks 28 secured to the extension member 22 in spaced relation to one another, as seen particularly in FIGURE 5. Thus, the extension member 22, the shoe member 23, and the abutment blocks 28 are adapted to move as a unit rectilinearly of the frame when the parts are moved from the full-line position shown in FIGURE 2 to either of the positions shown by the dot-and-dash lines in this figure.

Any means may be provided for moving the shoe member 23 transversely of the frame 10, but in the form of the invention herein illustrated, there is provided a belt member, preferably a V-belt member 30, which extends transversely of the frame and around pulleys 31 arranged at each side of the frame, as shown best in FIGURE 2. Usually, the belt is constantly driven at a slow speed by a chain or the like 32 engaging a sprocket 33 on the shaft of one of the pulleys 31. This chain is connected through a speed reducer 34 to a motor 35 so that the V-belt 30 may be constantly driven at a relatively low speed. The two flights 30a and 30b of the belt 30 move in opposite directions, as indicated by the arrows in FIGURE 2.

The V-belt 30 is adapted to be pressed into clutching engagement with one or the other of V-grooves 36 formed in the shoe 23. This clutching connection is established when the shoe 23 is moved to the left or the right, as viewed in FIGURE 5, to cause one or the other of the abutment blocks 28 to press the V-belt 30 into frictional engagement with one of the V-grooves 36. When this occurs, the shoe 23, the lever extension 22 and the lever 19 are moved from the full-line position illustrated in FIGURE 2 to either of the positions ilustrated by dot-and-dash lines or to any intermediate positions.

The end of the lever extension 22 is bifurcated to form a pair of arms 37, each of which is provided with a frictionally held block 38 made of wood or the like. These blocks engage the saw 13 to move the same longitudinally of its shaft 14. As shown in FIGURE 7, each block extends into a housing 39 provided with an adjusting screw 40 so that the blocks 38 may be adjusted as they become worn and thus properly engage opposite sides of the saw 13.

The movement of the shoe 23 and hence the clutching and declutching of the shoe with the belt 30 is controlled by a control handle 40 pivotally mounted as at 41 on the bifurcated end of the lever 19. Associated with the control handle 40 is a pair of quadrants 42 and 43 secured to the end of the frame 10, as shown in FIGURE 2. These quadrants are fragmentarily illustrated in FIGURES 3 and 4. The quadrant 42 is provided with a plurality of notches 44 adapted to be engaged by a lug or detent 45 on the underside of the lever 19. When the detent 45 engages in one of the notches 44, the lever 19 is held against movement and hence the saw 13 is held in its adjusted position on its shaft 14. The handle 40 has a depending lug or ear 46 which is pivotally connected as at 47 to a connecting rod 48, the other end of which is pivotally connected as at 49 to the shoe 23. Thus movement of the control handle 40 about its pivot 41 will move the shoe 23 either to the right or to the left, as viewed in FIGURE 5. The control handle 40 is provided with fulcrum members 50 and 51 which are adapted to respectively engage the quadrants 42 and 43. Thus, when the control handle 40 is lifted or moved upwardly, the fulcrum member 50 engages the quadrant 42 to raise the lever 19 and lift the detent 45 out of a notch 44 so that the lever 19 is free to swing about its pivot 18. At the same time, the connecting rod 48 is moved to the right, as viewed in FIGURE 4, to move the shoe 23 to the right to cause the flight 30a of the belt to engage the adjacent abutment block 28 and to force the flight 30a of the belt into the adjacent V-groove 36. This couples the shoe with the V-belt so that the shoe will be moved in the direction of movement of the flight 30a of the belt 30. This will cause the lever 19 to be moved to the position indicated by 19a in FIGURE 2, and the saw 13 will be correspondingly adjusted on its shaft 14. When the control handle 40 is moved downwardly, the fulcrum member 51 engages the quadrant 43. This lifts the detent 45 out of the notch 44 so that the lever 19 is free to move and at the same time moves the connecting rod 48 to the left. This moves the shoe 23 to the left, as viewed in FIGURE 5, so as to force the flight 30b of the belt into the adjacent V-groove 36 and thus couple the shoe with the flight 30b of the belt. This will cause the lever 19 to move to the position indicated by 19b in FIGURE 2. When the handle is brought into a neutral position and released, the detent 45 on the lever 19 again engages one of the notches 44 to hold the lever 19 against accidental movement.

From the foregoing, it is believed that the operation of the device is clear. While a constantly moving belt 30 is disclosed as the means for moving the shoe 23 and consequently adjusting the saw 13, other type of power means may be employed with equal facility.

As will be apparent from the foregoing description, the objects and advantages of this invention are attained by a construction which is so reduced in the number and character of its component parts as to approach the ultimate in structural simplicity. The simplicity of the device creates an economy in its manufacture, installation and maintenance costs.

While one commercially practical embodiment of the invention has been described and illustrated herein somewhat in detail, it will be understood that various changes may be made as may come within the purview of the accompanying claims.

What is claimed is:

1. In a device of the class described, a frame, a rotary saw mounted on a drive shaft for longitudinal movement thereon, a lever member pivotally supported interjacent its end and operatively connected adjacent one end to said saw, driving means for moving said saw on its drive shaft, and control means carried by said lever for connecting said driving means to said saw to adjust the saw longitudinally of its drive shaft and moving the adjacent end of the lever therewith while the other end is moved in the opposite direction.

2. In a device of the class described, a frame, a saw adjusting lever pivotally mounted intermediate its ends on said frame, a rotary saw splined to its drive shaft and movable transversely of said frame, means operatively connecting one end of said lever to said saw to move the saw on its drive shaft transversely of said frame, a control handle on the other end of said lever, a driving belt having two flights moving in opposite directions transversely of said frame, and means actuated by said control handle for connecting said lever to either one of said flights to move said lever and saw to selected positions of adjustment while the control handle is moved in an opposite direction.

3. In a device of the class described, a frame, a saw adjusting lever pivotally mounted intermediate its ends on said frame, a rotary saw mounted on a drive shaft for longitudinal movement thereon, means operatively connecting one end of said lever to said saw to move said saw longitudinally on its drive shaft, a control handle on the other end of said lever, a driving belt having two flights moving in opposite directions transversely of said frame, means including an adjustable shoe member and fixed abutments carried by said lever for establishing a driving connection between either one of said flights and said lever, and means connecting said shoe member to said control handle whereby said shoe member may be adjusted and said lever connected to said driving belt to move said lever and saw to selected positions of adjustment.

4. In a device of the class described, a frame, a saw adjusting lever pivotally mounted intermediate its ends on said frame, a rotary saw splined to its drive shaft and movable transversely of said frame, means operatively connecting one end of said lever to said saw to move the saw on its drive shaft transversely of said frame, a control handle on the other end of said lever, a driving belt having two flights moving in opposite directions transversely of said frame, a shoe member adjustably mounted on said lever adapted to engage the flights of said driving belt, fixed abutments on said lever, and means connecting said control handle to said shoe member to move the same toward either of said abutments to operatively connect said lever to one of the flights of said driving belt to move said lever and saw to selected positions of adjustment.

5. A device as described in claim 2 in which locking means are provided for the shifting lever comprising a detent carried by said lever, a pair of quadrants, one of which is provided with notches engaged by said detent, and in which said control handle is pivotally mounted on said lever and is provided with portions engaging said quadrants to lift said detent from engagement with said notches when said control handle is actuated.

References Cited by the Examiner

UNITED STATES PATENTS 1,835,041  12/1931  Hagmaier et al.

WILLIAM W. DYER, Jr., *Primary Examiner.*

W. D. BRAY, *Assistant Examiner.*